Patented Oct. 14, 1941

2,258,721

UNITED STATES PATENT OFFICE 2,258,721

CONDENSATION PRODUCTS OF CYCLIC AMIDINES

Richard Sallmann, Bottmingen, Switzerland, assignor to Society of Chemical Industry in Basle, Basel, Switzerland No Drawing. Application August 1, 1939, Serial No. 287,852. In Switzerland August 13, 1938

9 Claims. (Cl. 260—309)

This invention relates to the manufacture of new condensation products by causing a cyclic amidine or a compound containing the atom grouping

as a member of a ring to act in the presence of an acid on a carboxylic acid-N-methylolamide.

As cyclic amidines or compounds containing the atom grouping

as a member of a ring there may be used in this invention for example cyclic amidines, for instance imidazoles or imidazolines, substituted if desired. For example there come into consideration imidazole, α-methylglyoxaline, μ-undecylimidazole, benzimidazole, μ-methyl-, ethyl, butyl-, undecyl-, pentadecyl-, heptadecyl-, heptadecenyl-benzimidazole, benzimidazole-μ-methylene-benzylether, benzimidazole-μ-methylene-amyl-thioether, N-alkyl-benzimidazoles, for instance N-methyl-μ-heptadecylbenzimidazole, N-benzyl-μ-alkyl-benzimidazole, μ-naphthenylbenzimidazole, μ-undecyl-1:2-naphthimidazole, μ-undecyl-perimidine, μ-methyl-, ethyl-, propyl-, undecyl-, heptadecenyl-imidazoline or the like. The benzimidazoles contain a ring of the benzene series, the naphthimidazoles a ring of the naphthalene series. The benzimidazoles and the naphthimidazoles may correspond for example to the general formula

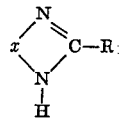

wherein x stands for an aromatic radical selected from the group consisting of radicals of the benzene and of the naphthalene series which is united to the two nitrogen atoms by two carbon atoms in ortho-position, and wherein R₁ represents an alkyl radical. Particularly valuable products are obtained when using as starting materials cyclic amidines of the general formula

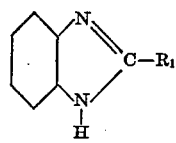

wherein R₁ stands for an alkyl radical containing an odd number of carbon atoms between 10 and 18. Valuable products are also obtained when starting from cyclic amidines of the general formula

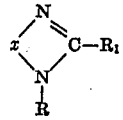

wherein x stands for an aromatic radical selected from the group consisting of radicals of the benzene and of the naphthalene series which is united to the two nitrogen atoms by two carbon atoms in ortho-position, R₁ stands for an alkyl radical and R stands for a member of the group consisting of alkyl and benzyl. Those products of the last mentioned formula are particularly easily obtained in which R₁ stands for an alkyl radical containing an odd number of carbon atoms between 10 and 18. The heterocyclic compounds having the atomic grouping

may contain a reactive substituent or a group determining or enhancing solubility in water, for instance a sulfonic acid group, a carboxylic acid group or a hydroxy-group or any other of the groups mentioned below as determining or enhancing water solubility. Examples of such cyclic amidines are for instance the above named μ-substituted benzimidazoles which contain a sulfonic acid group in the aromatic nucleus.

Amide-like parent materials of the methylol compounds which come here into question, are for instance amides and urethanes which may contain any desired substituents, but must contain at least on hydrogen atom at the nitrogen atom of the carboxyamide group. Instances are aliphatic, aromatic, aliphatic-aromatic, cyclo-aliphatic and heterocyclic amides, for example amides of the following acids:—acetic, propionic, acrylic, butyric, caprylic, capric, undecylic, lauric, myristic, palmitic, stearic, oleic, benzoic, naphthoic hexahydrobenzoic; also amides of resin acids, naphthenic acids, chloro-acetic acid, chloromethyl benzoic acids, chloropropionic acid, salicylic acid; also the corresponding N-substitution products of any of these acids which still contain at least one free hydrogen atom attached to the nitrogen atom; for instance N-methyl or N-ethyl lauric acid amide. Included among the amides in question are also urea and melamine and their substitution products, for instance monomethyl-urea.

Suitable urethanes are for example those substituted at the oxygen atom by methyl-, ethyl-, octyl-, dodecyl-, benzyl- or cyclohexyl-residues.

The aforesaid methylol compounds which are suitable for the invention are either known (methylolurea, N:N - dimethylmethylol - urea, methylolchloracetamide, stearic acid-methylolamide, salicylic acid methylolamide or the like) or may be made without further direction by analogous methods, for instance by causing the amide-like compounds to react in a solvent, for instance water, alcohol, acetone, glacial acetic acid, benzene, pyridine or mixtures thereof at the ordinary temperature or moderately raised temperature, for example 50–100° C., with formaldehyde, if desired in presence of a basic or acid catalyst, for instance trimethylamine, potassium carbonate, barium hydroxide, hydrogen chloride, sulfuric acid or a salt such as zinc chloride.

The amide-like parent materials of the methylol compounds as well as the aforesaid cyclic amidines may contain groups which determine or enhance water-solubility or substituents which are capable of conversion into such groups. This conversion may be effected for instance after the production of the condensation product.

As a group which determines or enhances water-solubility the aforesaid amide-like compounds may contain a sulfonic acid-, thiosulfuric acid-, sulfuric acid ester- or carboxylic acid- group in free or neutralized form or a quaternary ammonium group, for example a methylol compound of sulfoacetamide or of carbonic acid amide which contains a quaternary ammonium group, for instance an addition product of a tertiary amine such as trimethylamine, pyridine, methylpiperidine, hexamethylenetetramine to the N-methylol derivative of the halogen carboxylic acid amide. Also hydroxyl groups, for instance in the form of a glycerine ester or a poly-glycerine ester or a poly-glycol residue may be contained in the parent material as groups determining or enhancing water-solubility.

The process of causing the reaction between the methylol compound and the cyclic amidine may consist in mixing together the components at room temperature or at a higher temperature preferably in the presence of a solvent, for instance water, methanol, ethyl-alcohol, dioxane, glacial acetic acid, acetone, benzene, toluene or pyridine, and in presence of an acid catalyst, for instance hydrochloric acid or sulfuric acid. It may be necessary to heat the mixture for a prolonged time at a high temperature, for instance 100° C. In place of the methylolamides there may be used for the reaction with the cyclic amidine in the manner above described a mixture of a corresponding amide and formaldehyde, for instance paraformaldehyde.

A reactive substituent when present in the parent compound, for instance a halogen atom may be converted for instance after the condensation by known method into a group determining or enhancing solubility in water. For example, a tertiary amine may be added to a halogen atom with formation of a quaternary ammonium salt, for instance in the presence of a solvent such as petroleum-ether. This addition occurs in many cases on standing at room temperature. Furthermore, a halogen atom may be caused to react with sodium thiosulfate, for instance in presence of a solvent such as water, methanol, ethyl-alcohol, acetone or a mixture of any of these. Hydroxy-groups which may be present in the condensation product may be converted into sulfuric acid ester groups, for instance by means of sulfuric acid, chlorosulfonic acid, fuming sulfuric acid, if desired in presence of a solvent, for instance a halogen hydrocarbon, diethyl ether, dichlorodiethyl ether or another substance favoring the reaction, for instance glacial acetic acid, acetic anhydride. Especially suitable for this purpose is the addition product of sulfur trioxide to a tertiary base, for instance pyridine.

The condensation products obtained according to the present process from cyclic amidines with formaldehyde derivatives of such carboxylic acid amides in which the nitrogen atom of the amide group is united with at least one hydrogen atom, are liquid to solid substances which are decomposed into basic compounds on prolonged boiling with hydrochloric acid. When suitably selecting the parent materials there may be obtained according to the present process products of the general formula

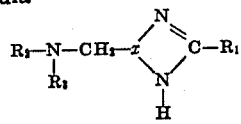

wherein $x$ stands for an aromatic radical selected from the group consisting of radicals of the benzene and of the naphthalene series which is united to the nitrogen atoms by two carbon atoms standing in ortho-position and which is substituted by a -CH$_2$-, R$_1$ stands for an alkyl radical, R$_2$ stands for an acyl radical of a carboxylic acid which contains at least one water-solubilizing group, and R$_3$ stands for a member of the group consisting of hydrogen and alkyl radicals. Particularly valuable are the products of the last-mentioned formula wherein R$_3$ stands for hydrogen, R$_1$ stands for an alkyl radical containing an odd number of carbon atoms between 10 and 18, and R$_2$ stands for an aliphatic acyl radical containing less than 6 carbon atoms. When starting from N-alkylated or N-benzylated imidazols of the benzene and of the naphthalene series, there are obtained products of the general formula

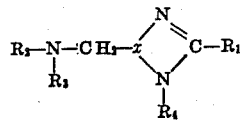

wherein R$_1$, R$_2$ and R$_3$ have the significance indicated in the last two sentences, and R$_4$ stands for a member of the group consisting of alkyl radicals and benzyl.

The products of the invention are useful as adjuvants, for instance in the textile industry, leather industry and paper industry. The products insoluble in water are suitable when the parent material has been properly selected as intermediate products for the manufacture of textile adjuvants or of dyestuffs. In many cases the water-insoluble products may be used as waxes. Owing to their capillary active properties those water-insoluble products which contain an aliphatic or cycloaliphatic radical of high molecular weight are valuable as agents for wetting, washing, emulsifying, foaming, levelling and softening. By suitable choice of the parent material the water-soluble salts have the property of being decomposed when heated or treated with saponifying agents, whereby insoluble bodies may separate. If this decomposition occurs on a substratum, for instance a textile fabric, the insoluble body is separated in an adherent form. Depending upon its nature it imparts to the fiber certain valuable properties. Among these may be mentioned the production of fast to washing, water-proofing or water-repelling properties united if desired with special softness and fullness, which latter may be enhanced by the addition of separate filling agents. As another effect may be named a strong diminution of hygroscopic properties and enhancement of insulating properties with regard to heat and electricity. As further properties which the fiber may acquire may be named stability to creasing, the shifting of the woven threads, the diminution of lustre, the increase of stability to water, the prevention of shrinking the fabric and in the case of wool the prevention of felting. By local application of the invention there may be obtained the effects of calendering, matting and damask also colored effects which are due to the varied affinity of the fiber for dyestuffs. When the process is applied to colored textiles the properties of the dyeings, for instance fastness to light, rubbing, washing and water may be essentially increased. These various effects may be interconnected one with the other.

The products of the invention may be used alone or in conjunction with other substances, for instance salts, especially salts of weak acids and in particular sodium acetate and also together with solvents, soaps, soapy materials, protective colloids, finishing agents, loading agents, softening agents or matting agents.

The following examples illustrate the invention, the parts being by weight and the parts by weight having the same relationship to parts by volume as has the kilo to the liter.

*Example 1*

16 parts of μ-heptadecylbenzimidazole are dissolved at about 20° C. in 70 parts of concentrated sulfuric acid, 7 parts of finely pulverized methylol-chloracetamide are introduced into the solution, while stirring, at about 10° C. and the whole is further stirred overnight at ordinary temperature. The mass is then introduced into ice water and filtered; the solid matter is washed with water and dried, whereupon a white pulverulent mass is obtained.

When heated with pyridine the product forms a water-soluble quaternary salt.

*Example 2*

25 parts of μ-heptadecylbenzimidazole are dissolved in 25 parts of glacial acetic acid at the temperature of the water bath, whereupon there is added a solution of 13 parts of the addition compound made from methylolchloracetamide and trimethylamine. Finally there are added to the mixture 2 parts of concentrated hydrochloric acid. The mass is then heated at water bath temperature with constant stirring until a sample dissolves clearly in water which happens in 12-20 hours.

The acetic acid is then distilled in a vacuum whereupon the new product which corresponds very probably to the formula

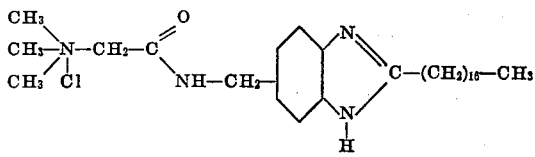

remains as a syrupy mass which gradually solidifies; it is soluble with strong foaming in water to a clear solution, especially in the presence of a small proportion of acid. The new condensation product is decomposed on prolonged boiling with hydrochloric acid with formation of basic products.

The product behaves similarly which is obtained when instead of μ-heptadecylbenzimidazole μ-undecylbenzimidazole is used or a benzimidazole obtainable by the action of the fatty acids of hardened train oil on ortho-phenylenediamine. Instead of the addition product of trimethylamine with methylolchloracetamide there may also be used the addition product of pyridine with methylolchloracetamide or with α-bromolauric acid-methylolamide.

*Example 3*

16 parts of μ-heptadecylbenzimidazole are introduced at 15° C., while stirring, into 80 parts of concentrated sulfuric acid. When all is dissolved there are added in portions at about 10° C. 13 parts of finely pulverized sodium methylolacetamide sulfonate. After the whole of this has been added the mass is stirred for a further 2 hours at the same temperature. After standing overnight in an ice chest, the mass is poured into ice water and the solid matter is filtered, washed and recrystallized from about 150 parts by volume of alcohol. By neutralizing with caustic soda solution the acid so obtained, the sodium salt is produced which is soluble in water with strong foaming and has strongly capillary active properties. The new condensation product is very probably the sodium salt of the sulfonic acid of the formula

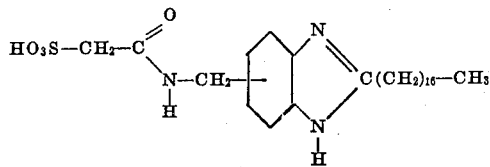

*Example 4*

4 parts of N-methyl-μ-heptadecylbenzimidazole hydrochloride are dissolved in 20 parts of concentrated sulfuric acid in the cold. Whilst stirring there are added by degrees at 15–20° C. 2.5 parts of finely powdered sodium methylolacetamide sulfonate. After stirring for 30 hours at ordinary temperature a sample neutralized with sodium carbonate is clearly soluble in water. The product is worked up as described in Example 3.

*Example 5*

8 parts of N-methyl-μ-heptadecylbenzimidazole hydrochloride are dissolved in 20 parts by volume of glacial acetic acid. There are added 5 parts of the addition product of methylolchloracetamide and trimethylamine and the solution is heated for 40 hours at 90–100° C. After distilling the glacial acetic acid in a vacuum the condensation product which corresponds very probably to the formula

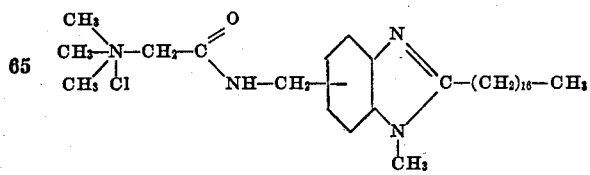

remains in the form of a soft mass which dissolves clearly in water accompanied by strong foaming. The solution remains clear even when rendered strongly alkaline by addition of sodium carbonate solution.

Example 6

6 parts of μ-heptadecyl-imidazoline are dissolved in 40 parts of concentrated sulfuric acid at 10–20° C. Whilst stirring 5 parts of finely powdered sodium methylolacetamide sulfonate are added. After stirring for 20 hours at room temperature a sample neutralized with sodium carbonate dissolves in water. The product is poured upon ice and the sulfonic acid extracted by means of butyl alcohol. By dissolving it in water, neutralizing with sodium carbonate and evaporating in a vacuum the sodium salt is obtained.

Example 7

6 parts of μ-heptadecylimidazoline and 5 parts of the addition product from methylolchloracetamide and trimethylamine are together dissolved in 10 parts by volume of glacial acetic acid and the solution is heated for 24 hours at 100° C. After distilling the glacial acetic acid in a vacuum the condensation product is obtained in the form of a soft mass clearly soluble in water. The aqueous solution foams strongly and unlike an aqueous solution of a salt of the parent base remains clear on addition of sodium carbonate solution.

Example 8

38 parts of cocoanut oil-benzimidazole are dissolved in 35 parts of glacial acetic acid and after addition of 26 parts of the quaternary salt from methylol-chloracetamide and trimethylamine the solution is heated for 24 hours at 90–100° C. while stirring. After distilling the solvent there is obtained the condensation product in the form of a semi-solid, light brown mass which dissolves in water on addition of a little acid to a clear foaming solution.

What I claim is:

1. The condensation products of cyclic amidines with a N-hydroxy-methyl derivative of a carboxylic acid amide containing at least one water-solubilizing group, which products are liquid to solid substances which are decomposed by prolonged boiling with hydrochloric acid to form basic compounds.

2. The condensation products of cyclic amidines containing an aromatic radical selected from the group consisting of radicals of the benzene and of the naphthalene series with a N-hydroxy-methyl derivative of a carboxylic acid amide containing at least one water-solubilizing group, which products are water-soluble liquid to solid substances which are decomposed by prolonged boiling with hydrochloric acid to form basic compounds.

3. The cyclic amidines of the general formula

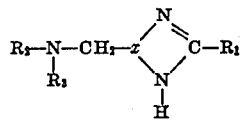

wherein $x$ stands for an aromatic radical selected from the group consisting of radicals of the benzene and of the naphthalene series bound to the two nitrogen atoms by two carbon atoms in ortho-position and being substituted by the $CH_2$-group, $R_1$ stands for an alkyl radical, $R_2$ stands for an acyl radical of a carboxylic acid containing at least one water-solubilizing group, and $R_3$ stands for a member of the group consisting of hydrogen and alkyl radicals, which products are identical with those which are obtainable by the process which comprises reacting a cyclic amidine of the general formula

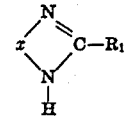

wherein $x$ stands for an aromatic radical selected from the group consisting of radicals of the benzene and of the naphthalene series bound to the two nitrogen atoms by two carbon atoms in ortho-position, and $R_1$ stands for an alkyl radical, with a N-hydroxymethyl-derivative of a carboxylic acid amide containing at least one water-solubilizing group, in the presence of an acid, and are water-soluble liquid to solid substances which are decomposed by prolonged boiling with hydrochloric acid to form basic compounds.

4. The cyclic amidines of the general formula

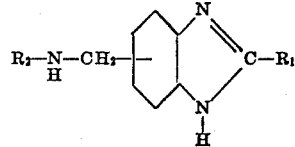

wherein $R_1$ stands for an alkyl radical containing an odd number of carbon atoms between 10 and 18, and $R_2$ stands for an acyl radical of an aliphatic carboxylic acid containing less than 6 carbon atoms and at least one water-solubilizing group, which products are identical with those which are obtainable by the process which comprises reacting a cyclic amidine of the general formula

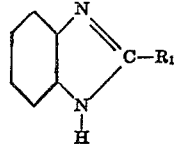

wherein $R_1$ stands for an alkyl radical containing an odd number of carbon atoms between 10 and 18, with a N-hydroxymethyl-derivative of an aliphatic carboxylic acid amide containing less than 6 carbon atoms and at least one water-solubilizing group, in the presence of an acid, and are water-soluble capillary active liquid to solid substances which are decomposed by prolonged boiling with hydrochloric acid to form basic compounds.

5. The cyclic amidine of the formula

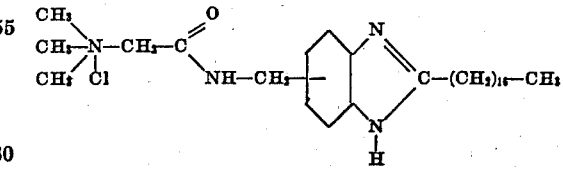

which product is identical with that which is obtainable by the process which comprises reacting the cyclic amidine of the formula

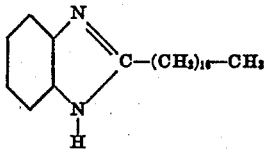

with the product of addition of trimethylamine to N-methylolchloracetamide in the presence of an acid, and is a water-soluble capillary active solid substance which is decomposed by prolonged boiling with hydrochloric acid to form basic compounds.

6. The salts of the cyclic amidine of the formula

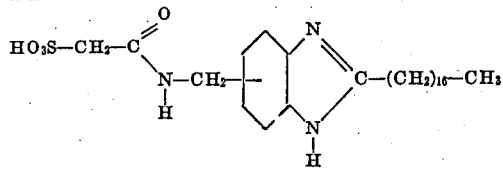

identical with that which is obtainable by the process which comprises reacting the cyclic amidine of the formula

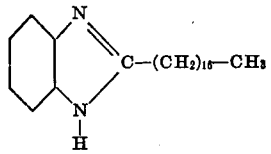

with a salt of the N-methylolacetamide sulfonic acid in the presence of an acid which salts are water-soluble capillary active solid substances which are decomposed by prolonged boiling with hydrochloric acid to form basic compounds.

7. The cyclic amidines of the general formula

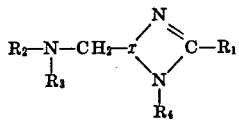

wherein $x$ stands for an aromatic radical selected from the group consisting of radicals of the benzene and of the naphthalene series bound to the two nitrogen atoms by two carbon atoms in ortho-position and being substituted by the $CH_2$-group, $R_1$ stands for an alkyl radical, $R_2$ stands for an acyl radical of a carboxylic acid containing at least one water-solubilizing group, $R_3$ stands for a member of the group consisting of hydrogen and alkyl radicals, and $R_4$ stands for a member of the group consisting of alkyl radicals and benzyl, which products are identical with those which are obtainable by the process which comprises reacting a cyclic amidine of the general formula

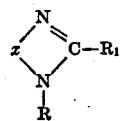

wherein $x$ stands for an aromatic radical selected from the group consisting of radicals of the benzene and of the naphthalene series bound to the two nitrogen atoms by two carbon atoms in ortho-position, R stands for a member of the group consisting of alkyl radicals and benzyl, and $R_1$ stands for an alkyl radical, with a N-hydroxymethyl-derivative of a carboxylic acid amide containing at least one water-solubilizing group, in the presence of an acid, and are water-soluble liquid to solid substances which are decomposed by prolonged boiling with hydrochloric acid to form basic compounds.

8. The cyclic amidines of the general formula

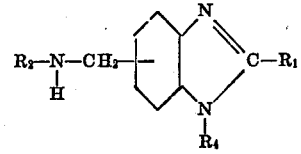

wherein $R_1$ stands for an alkyl radical containing an odd number of carbon atoms between 10 and 18, $R_2$ stands for an acyl radical of an aliphatic carboxylic acid containing less than 6 carbon atoms and at least one water-solubilizing group, and $R_4$ stands for an alkyl radical, which products are identical with those which are obtainable by the process which comprises reacting a cyclic amidine of the general formula

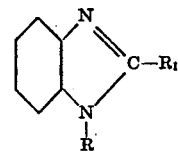

wherein R stands for an alkyl radical, and $R_1$ stands for an alkyl radical containing an odd number of carbon atoms between 10 and 18, with a N-hydroxymethyl-derivative of an aliphatic carboxylic acid amide containing less than 6 carbon atoms and at least one water-solubilizing group, in the presence of an acid, and are water-soluble capillary active liquid to solid substances which are decomposed by prolonged boiling with hydrochloric acid to form basic compounds.

9. The cyclic amidine of the formula

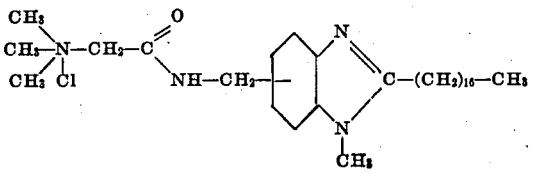

which product is identical with that which is obtainable by the process which comprises reacting the cyclic amidine of the formula

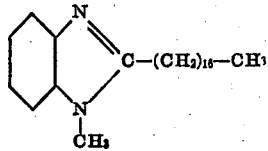

with the product of addition of trimethylamine to N-methylolchloracetamide, in the presence of an acid, and is a water-soluble capillary active soft mass which is decomposed by prolonged boiling with hydrochloric acid to form basic compounds.

RICHARD SALLMANN.